US008379553B2

(12) United States Patent
Lioy et al.

(10) Patent No.: US 8,379,553 B2
(45) Date of Patent: Feb. 19, 2013

(54) METHOD AND APPARATUS FOR MITIGATING THE IMPACT OF RECEIVING UNSOLICITED IP PACKETS AT A WIRELESS DEVICE

(75) Inventors: Marcello Lioy, San Diego, CA (US); Sriram Nagesh Nookala, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 857 days.

(21) Appl. No.: 11/135,819

(22) Filed: May 23, 2005

(65) Prior Publication Data

US 2006/0109846 A1 May 25, 2006

Related U.S. Application Data

(60) Provisional application No. 60/630,260, filed on Nov. 22, 2004.

(51) Int. Cl.
G08C 17/00 (2006.01)
H04M 3/00 (2006.01)
H04M 1/00 (2006.01)
H04W 4/00 (2009.01)

(52) U.S. Cl. ......... 370/311; 455/418; 455/574; 370/328
(58) Field of Classification Search ........... 370/328, 370/338
See application file for complete search history.

(56) References Cited

U.S. PATENT DOCUMENTS

| 5,265,270 | A | 11/1993 | Stengel et al. | |
|---|---|---|---|---|
| 6,058,289 | A * | 5/2000 | Gardner et al. | 340/7.32 |
| 6,480,476 | B1 * | 11/2002 | Willars | 370/311 |
| 6,622,251 | B1 * | 9/2003 | Lindskog et al. | 713/300 |
| 6,748,247 | B1 * | 6/2004 | Ramakrishnan et al. | 455/574 |
| 2002/0106997 | A1 | 8/2002 | Barber et al. | |
| 2002/0172178 | A1 | 11/2002 | Suzuki et al. | |
| 2002/0177461 | A1 * | 11/2002 | Rosen et al. | 455/518 |
| 2003/0100310 | A1 | 5/2003 | Lindner et al. | |
| 2003/0117968 | A1 | 6/2003 | Motegi et al. | |

(Continued)

FOREIGN PATENT DOCUMENTS

| JP | 6508248 | 9/1994 |
|---|---|---|
| JP | 1028150 | 1/1998 |
| JP | 10276194 | 10/1998 |
| JP | 200244012 | 2/2002 |
| JP | 200337874 | 2/2003 |
| JP | 2006524943 | 11/2006 |
| WO | WO9222145 | 12/1992 |
| WO | 0103451 A1 | 1/2001 |
| WO | 03096730 A1 | 11/2003 |

OTHER PUBLICATIONS

International Search Report and Written Opinion—PCT/US2005/041845, International Search Authority—European Patent Office—Jul. 11, 2006. Katsuhiko Kanazawa, "All About TCP", Network Magazine, Japan, Kabushiki Kaisha Ascii, Nov. 1, 2004, No. 9, vol. 11, pp. 60 to 79.

*Primary Examiner* — Huy C Ho
(74) *Attorney, Agent, or Firm* — Kevin T. Cheatham (57) ABSTRACT

To initiate dormancy early, a wireless device receives an IP packet from a wireless network and determines whether the received IP packet is an unsolicited IP packet. An unsolicited IP packet may be declared if the received IP packet causes the wireless device to reactivate from dormancy or is not delivered to an application or service running at the wireless device. The wireless device transitions to dormancy early if the received IP packet is deemed to be an unsolicited IP packet and no other events prevent transition to dormancy. The wireless device may use (1) a shortened value for an inactivity timer for a predetermined time duration if an unsolicited IP packet is detected and (2) a nominal value for the inactivity timer thereafter. The wireless device resets the inactivity timer whenever an IP packet is sent or received and transitions to dormancy upon expiration of the inactivity timer.

20 Claims, 7 Drawing Sheets

U.S. PATENT DOCUMENTS

| | | |
|---|---|---|
| 2004/0022225 A1 | 2/2004 | Liang et al. |
| 2004/0109423 A1* | 6/2004 | Sayeedi et al. ................. 370/328 |
| 2004/0218556 A1* | 11/2004 | Son et al. ....................... 370/311 |
| 2005/0041631 A1* | 2/2005 | Aerrabotu et al. ............ 370/349 |
| 2005/0070340 A1* | 3/2005 | Kim ............................... 455/574 |
| 2005/0073969 A1* | 4/2005 | Hart et al. ..................... 370/318 |
| 2005/0122930 A1* | 6/2005 | Zhao et al. .................... 370/328 |
| 2005/0287949 A1* | 12/2005 | Harris et al. ...................... 455/9 |
| 2006/0003784 A1* | 1/2006 | Chion et al. ................... 455/518 |
| 2006/0040681 A1* | 2/2006 | Julka et al. .................... 455/458 |
| 2006/0242414 A1* | 10/2006 | Corson et al. ................. 713/171 |

* cited by examiner

METHOD AND APPARATUS FOR MITIGATING THE IMPACT OF RECEIVING UNSOLICITED IP PACKETS AT A WIRELESS DEVICE

This application claims the benefit of provisional U.S. Application Ser. No. 60/630,260, entitled "Method for Reducing the Impact of Receiving Unsolicited IP Packets on a Mobile Station," filed Nov. 22, 2004, assigned to the assignee of the present application, and incorporated herein by reference in its entirety for all purposes.

BACKGROUND

I. Field

The present disclosure relates generally to communication, and more specifically to techniques for processing Internet Protocol (IP) packets at a wireless device.

II. Background

Wireless communication networks are widely deployed to provide various communication services such as voice, packet data, and so on. A wireless device may obtain data service from a wireless network by using IP over an air-link interface employed by the wireless network. The wireless device may establish a data session with a network entity and exchange data with other entities coupled to the wireless network via the Internet or some other network.

The wireless device may operate in an active state or a dormant state at any given moment during the data session. The wireless device may be active for only a portion of the time during the data session, which may be opened for an extended period of time. For example, the wireless device may transmit and/or receive packet data in short bursts and may remain in dormancy for significant periods of time between these data bursts. Dormancy refers to a scenario in which the data session is opened but radio resources are released. To conserve battery power, which is important for a portable device such as a cellular phone, the wireless device may power down as much circuitry as possible while in dormancy. The wireless device may only wake up periodically to receive (1) page messages that alert the wireless device to the presence of an incoming call or packet data and (2) overhead messages that carry system and other information for the wireless device.

The wireless device may receive unsolicited IP packets from the wireless network while in dormancy. An unsolicited IP packet may be defined as an IP packet that is not requested by the wireless device and further has no corresponding application or service running at the wireless device. The reception of an IP packet while in dormancy typically causes the wireless device to re-establish traffic channels with the wireless network and remain in the active state for some period of time. If the received IP packet is an unsolicited IP packet, then the wireless device typically drops the IP packet and/or sends a reset packet and takes no further action. The unsolicited IP packet does not trigger an exchange of data with the wireless network. Instead, the unsolicited IP packet wastes system resources since traffic channels are established but not used for exchanging data. The unsolicited IP packet further consumes battery power and shortens standby time since the wireless device is turned on and ready for wireless communication as a result of receiving this IP packet.

There is therefore a need in the art for techniques to mitigate the impact of receiving unsolicited IP packets.

SUMMARY

Techniques for identifying unsolicited IP packets and initiating dormancy early at a wireless device are described herein. In an aspect, an IP packet received at the wireless device may be deemed as an unsolicited IP packet if the received IP packet (1) causes the wireless device to reactivate from dormancy (e.g., transition from the dormant state to the active state), (2) is not delivered to an application or a service running at the wireless device, (3) results in no reply or a single "reject" reply by the wireless device, or (4) satisfies some other condition or criterion.

In another aspect, the wireless device initiates dormancy early for unsolicited IP packets. The wireless device receives an IP packet from the wireless network and determines whether the received IP packet is an unsolicited IP packet. The wireless device transitions to dormancy early if the received IP packet is deemed to be an unsolicited IP packet and no other events prevent transition to dormancy.

The wireless device may use various mechanisms for transitioning to dormancy early. For example, the wireless device may maintain an inactivity timer while in the active state during the data session. The wireless device may reset the inactivity timer upon receiving or sending an IP packet and may transition to dormancy upon expiration of the inactivity timer. The inactivity timer may be operated with multiple timer values to mitigate the impact of unsolicited IP packets. In an embodiment, a received IP packet that causes reactivation from dormancy is deemed to be an unsolicited IP packet and results in the use of a shortened value for the inactivity timer for a predetermined time duration. A nominal value is used for the inactivity timer after this time duration. The shortened value allows the wireless device to go dormant early if reactivation was due to an unsolicited IP packet.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein to identify unsolicited IP packets and to initiate dormancy early may be used for various wireless networks. For example, these techniques may be used for a Code Division Multiple Access (CDMA) network, a Universal Mobile Telecommunications System (UMTS) network, a wireless local area network (LAN), and so on. A CDMA network may implement a radio access technology (RAT) such as cdma2000 and a networking protocol such as ANSI-41. A UMTS network may implement a RAT such as Wideband-CDMA (W-CDMA) and/or Global System for Mobile Communications (GSM) and a networking protocol such as GSM Mobile Application Part (GSM-MAP). A wireless LAN provides communication coverage for a limited geographic area and may be an IEEE 802.11 network, a Bluetooth personal area network (BT-PAN), and so on. In general, the techniques described herein may be used for a wireless wide area network (e.g., a CDMA or UMTS network) or a wireless LAN (e.g., an IEEE 802.11 network or a BT-PAN).

Figure 1:
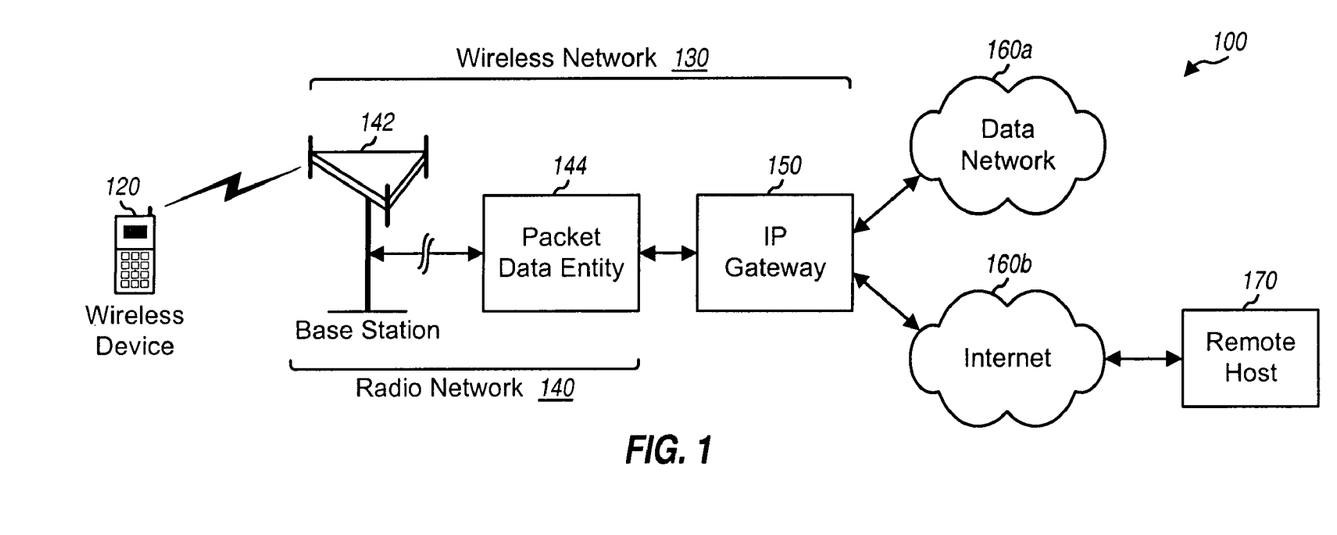
FIG. 1 shows an exemplary wireless deployment.

FIG. 1 shows a deployment 100 in which a wireless device 120 communicates with a wireless network 130 to obtain communication services. Wireless device 120 may also be called a mobile station (MS), a user equipment (UE), a user terminal, a subscriber unit, or some other terminology. Wireless network 130 includes a base station 142, a packet data entity 144, and an IP gateway 150. Base station 142 provides radio communication for wireless device 120. Packet data entity 144 controls the transmission of packets between base station 142 and IP gateway 150. IP gateway 150 supports data service for wireless devices in wireless network 130. For example, IP gateway 150 may be responsible for the establishment, maintenance, and termination of data sessions for the wireless devices and may further assign dynamic IP addresses to the wireless devices. IP gateway 150 may couple to a data network 160a, the Internet 160b, and/or other data networks. IP gateway 150 can communicate with various entities (e.g., a remote host 170) that couple to these data networks.

Wireless network 130 may also be viewed as being composed of a radio network 140 and a packet data network. Radio network 140 includes base station 142 and packet data entity 144 and supports radio communication. The packet data network includes IP gateway 150 and supports packet-switched communication between radio network 140 and external data networks.

Wireless network 130 may be a CDMA network, in which case packet data entity 144 is called a Packet Control Function (PCF) and EP gateway 150 is called a Packet Data Serving Node (PDSN). Wireless network 130 may also be a UMTS network, in which case packet data entity 144 is called a Serving GPRS Support Node (SGSN) and IP gateway 150 is called a Gateway GPRS Support Node (GGSN). Wireless network 130 may also be a wireless LAN.

Figure 2:
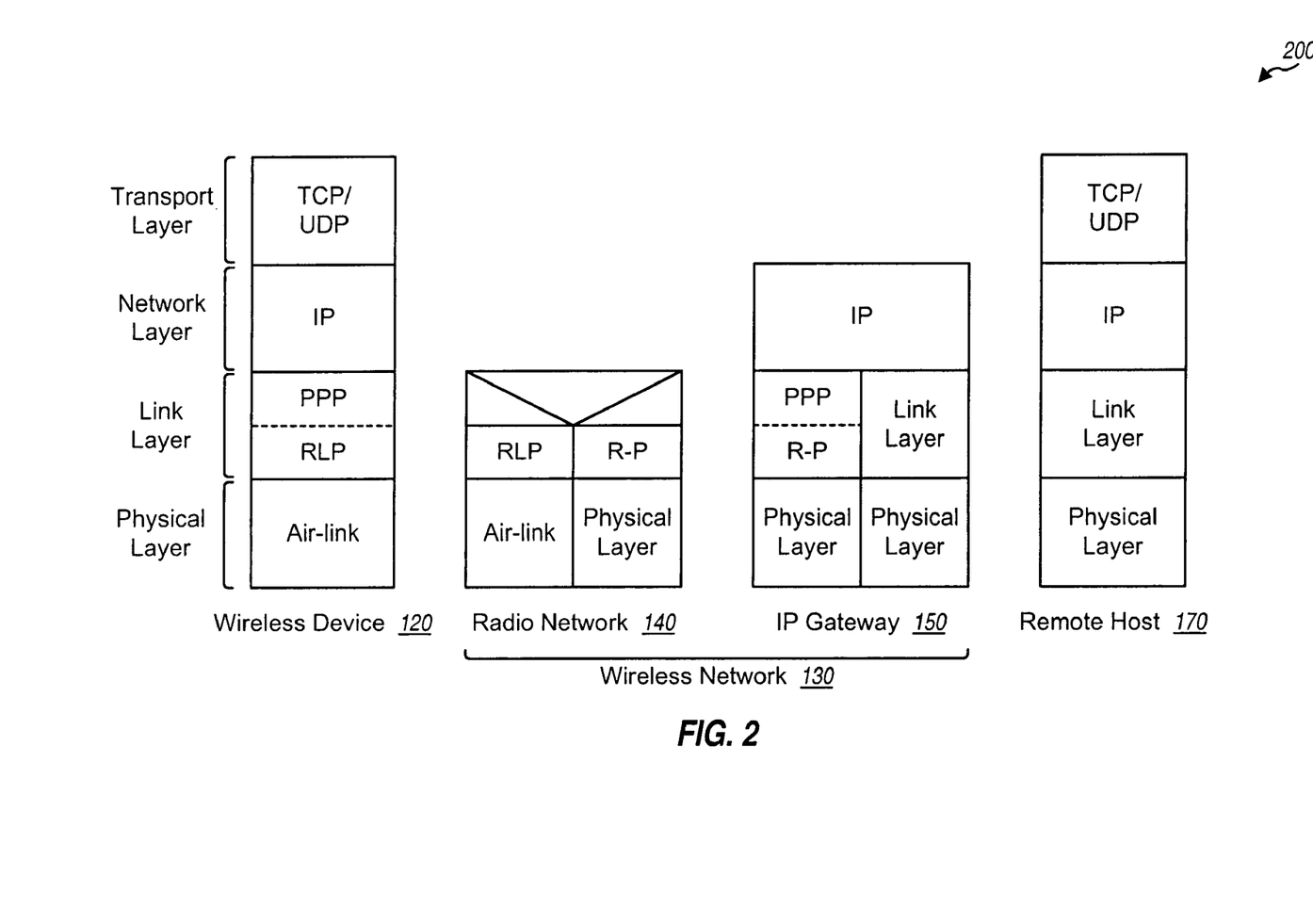
FIG. 2 shows an exemplary protocol stack.

FIG. 2 shows an exemplary protocol stack 200 for data communication between wireless device 120 and remote host 170 via wireless network 130. The protocol stack includes a transport layer, a network layer, a link layer, and a physical layer. Wireless device 120 and remote host 170 may communicate using Transmission Control Protocol (TCP), User Datagram Protocol (UDP), or some other protocol at the transport layer. TCP and UDP typically operate on top of IP at the network layer. Transport layer data is encapsulated in IP packets, which are exchanged between wireless device 120 and remote host 170 via radio network 140 and IP gateway 150.

The link layer between wireless device 120 and wireless network 130 is typically dependent on the wireless network technology. For a CDMA network, the link layer is implemented with a Point-to-Point Protocol (PPP) over a Radio Link Protocol (RLP). Wireless device 120 maintains a PPP session with IP gateway 150 for a data session and communicates with radio network 140 via RLP for data exchanges. RLP operates on top of an air-link interface (e.g., cdma2000). Radio network 140 communicates with IP gateway 150 via a technology-dependent interface (e.g., an "R-P" interface for a CDMA network) that operates on top of a physical layer. IP gateway 150 communicates with remote host 170 via IP over a link layer and a physical layer. The various layers may be different for other wireless networks.

Figure 3:
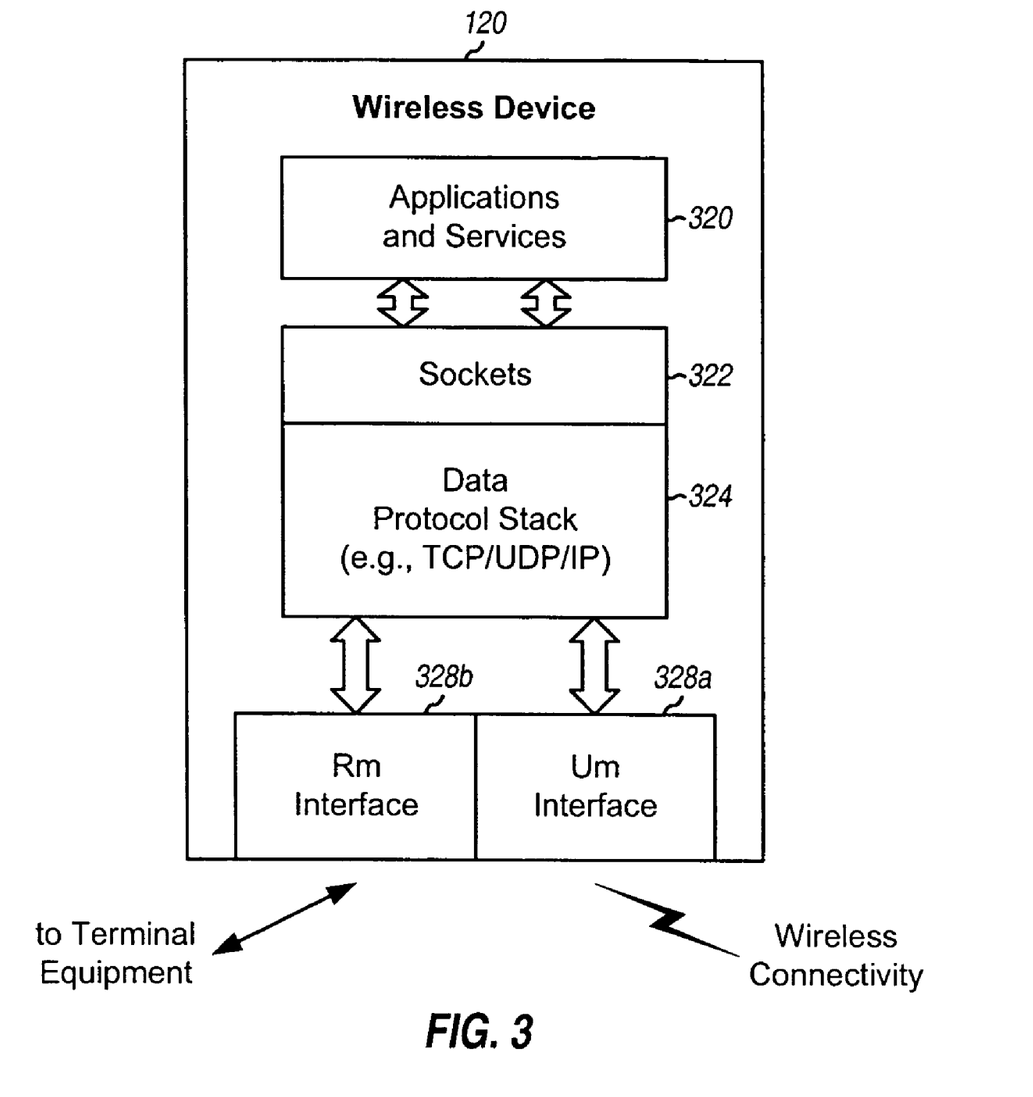
FIG. 3 shows an embodiment of a wireless device.

FIG. 3 shows an embodiment of wireless device 120. At wireless device 120, applications and services 320 execute over sockets 322 and a data protocol stack 324. A socket is one endpoint of a two-way communication path between two applications running on a network. In the context of the Internet, a socket is associated with an IP address, a protocol at the transport layer (e.g., TCP or UDP), and a port number for the transport layer protocol. Each application running at wireless device 120 is associated with one or more sockets and exchanges data with external entities via the associated sockets. Each service (e.g., FTP, Telnet, and so on) may also be associated with one or more sockets. For the embodiment shown in FIG. 3, data protocol stack 324 utilizes TCP and/or UDP operating on top of IP. In general, a data protocol stack may implement any combination of protocols for any number of layers. Wireless device 120 communicates with wireless network 130 via a Um interface 328a and may further communicate with a terminal equipment via an Rm interface 328b. The terminal equipment may be a laptop computer, a personal digital assistant (PDA), or some other computing device.

Wireless device 120 may have an open data session with IP gateway 150 but may exchange data sporadically. During the data session, the wireless device may enter the active state when there is data to exchange (e.g., send or receive) and may enter the dormant state when there is no data to exchange. The wireless device transitions between the active and dormant states depending on data activity.

Wireless device 120 communicates with radio network 140 in order to exchange data with IP gateway 150 and remote host 170. In the active state, wireless device 120 may establish (1) a forward link traffic channel used to receive data from radio network 140 and (2) a reverse link traffic channel used to send data to radio network 140. In the dormant state, the wireless device relinquishes the traffic channels and may power down as much circuitry as possible in order to conserve battery power.

Wireless device 120 may receive an IP packet from wireless network 130 while in the dormant state. The received IP packet reactivates the wireless device from dormancy and causes the wireless device to reestablish the traffic channels for the forward and/or reverse links in anticipation of possible exchange of data with the wireless network. If the received IP packet is an unsolicited IP packet, then the wireless device typically drops the IP packet and/or sends a TCP reset packet and performs no other action. In this case, it is desirable to release the traffic channels and transition back to dormancy early.

Figure 4:
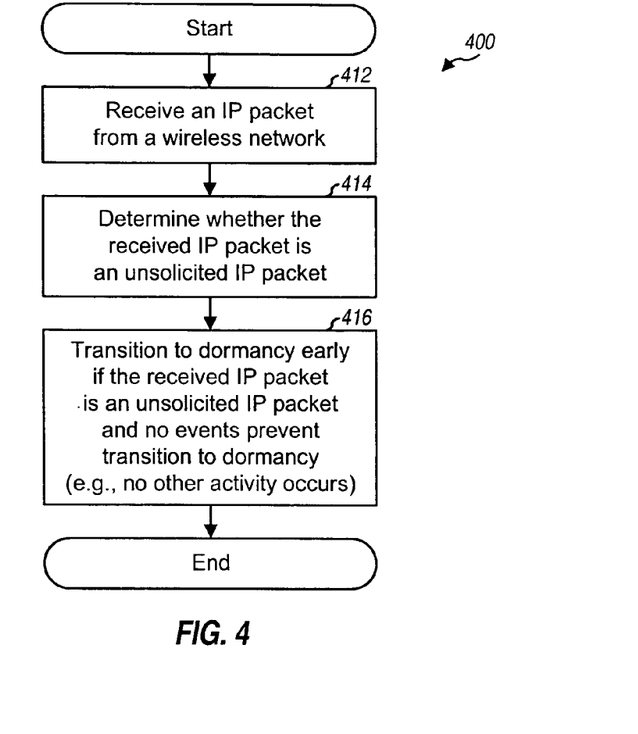
FIG. 4 shows a process for transitioning to dormancy early for unsolicited IP packets.

FIG. 4 shows a flow diagram of a process 400 for transitioning to dormancy early for unsolicited IP packets. Initially, an IP packet is received from the wireless network (block 412). A determination is made whether the received IP packet is an unsolicited IP packet (block 414). This determination may be made based on various criteria. The wireless device transitions to dormancy early if the received IP packet is deemed to be an unsolicited IP packet and no other events prevent transition to dormancy, e.g., no other activity occurs (block 416).

The early transition to dormancy may be achieved in various manners. Several embodiments for transitioning to dormancy early based on an inactivity timer are described below.

Wireless device 120 may maintain an inactivity timer while in the active state. The inactivity timer determines the amount of time to remain in the active state without exchanging any data. The wireless device may reset the inactivity timer to a nominal value upon receiving or sending an IP packet and may enter the dormant state when the inactivity timer expires. The inactivity timer allows the wireless device to release the traffic channels when data is not being exchanged, thus saving radio resources.

The nominal value for the inactivity timer is typically selected to provide good performance for expected data usage. A short inactivity timer value may result in the wireless device being timed-out and entering dormancy too quickly, which may result in loss of data, e.g., due to a delayed response from a remote server. A long inactivity timer value may result in the wireless device maintaining the traffic channels for too long without exchanging any data, thereby wasting radio resources. The nominal value is typically selected based on a tradeoff between these two factors. A nominal value of around 20 seconds has been found to provide good performance under certain data usage scenarios.

The wireless device may receive an unsolicited IP packet while in dormancy. The unsolicited IP packet results in reactivation of the wireless device and sets the inactivity timer to the nominal value. The wireless device would then need to wait until the inactivity timer expires before transitioning back to dormancy and releasing the traffic channels.

In an embodiment of early dormancy, the inactivity timer is operated with multiple values to mitigate the impact of receiving unsolicited IP packets. A shortened value (which is shorter than the nominal value) may be used for the inactivity timer when the wireless device is reactivated from dormancy. The shortened value allows the wireless device to go back to dormancy and release the traffic channels earlier if the reactivation was due to an unsolicited IP packet. The nominal value may be used for the inactivity timer when the wireless device is exchanging data with the wireless network. The nominal value allows the wireless device to achieve the desired behavior in terms of the two factors noted above. The shortened value may be selected to achieve good performance, e.g., for the two factors noted above. For example, the nominal value may be 20 seconds, and the shortened value may be 5 seconds. The shortened value may also be a configurable value that is selected based on typical patterns for unsolicited traffic, network behavior, and so on. The configurable shortened value may also be restricted to be within a predetermined range of values, e.g., from one to five seconds.

Figure 5:
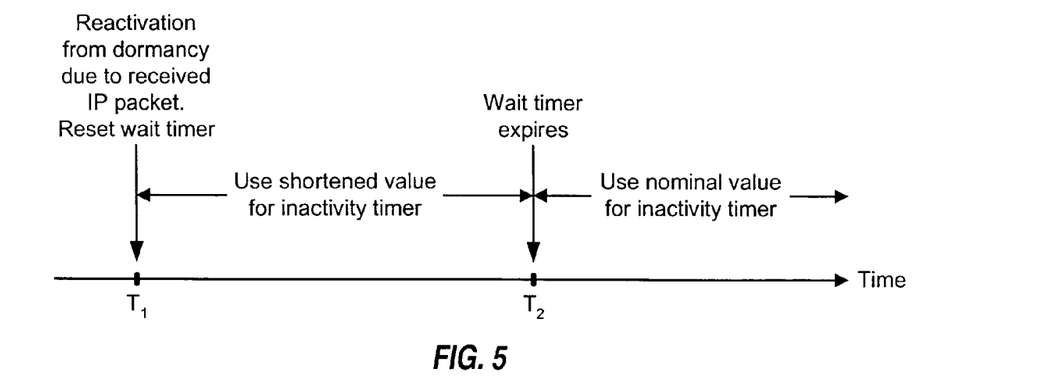
FIG. 5 illustrates the use of two values for the inactivity timer.

FIG. 5 illustrates the use of the shortened and nominal values for the inactivity timer, in accordance with an embodiment. For this embodiment, the shortened value is used for a predetermined time duration after the wireless device is reactivated from dormancy, which is called the wait period, and the nominal value is used after this wait period. The wait period may be a fixed value that is selected to provide good performance. For example, the wait period may be equal to the shortened value or the nominal value. Alternatively, the wait period may be a configurable value that is selected based on the typical patterns for unsolicited traffic. A wait timer may be used to keep track of the elapsed time for when the shortened value is used. By using the nominal value after the wait period, the wireless device can (1) treat network originated traffic and mobile originated traffic in the same manner and (2) provide the same behavior for both types of traffic in term of when inactivity should result in dormancy and release of the traffic channels.

Figure 6:
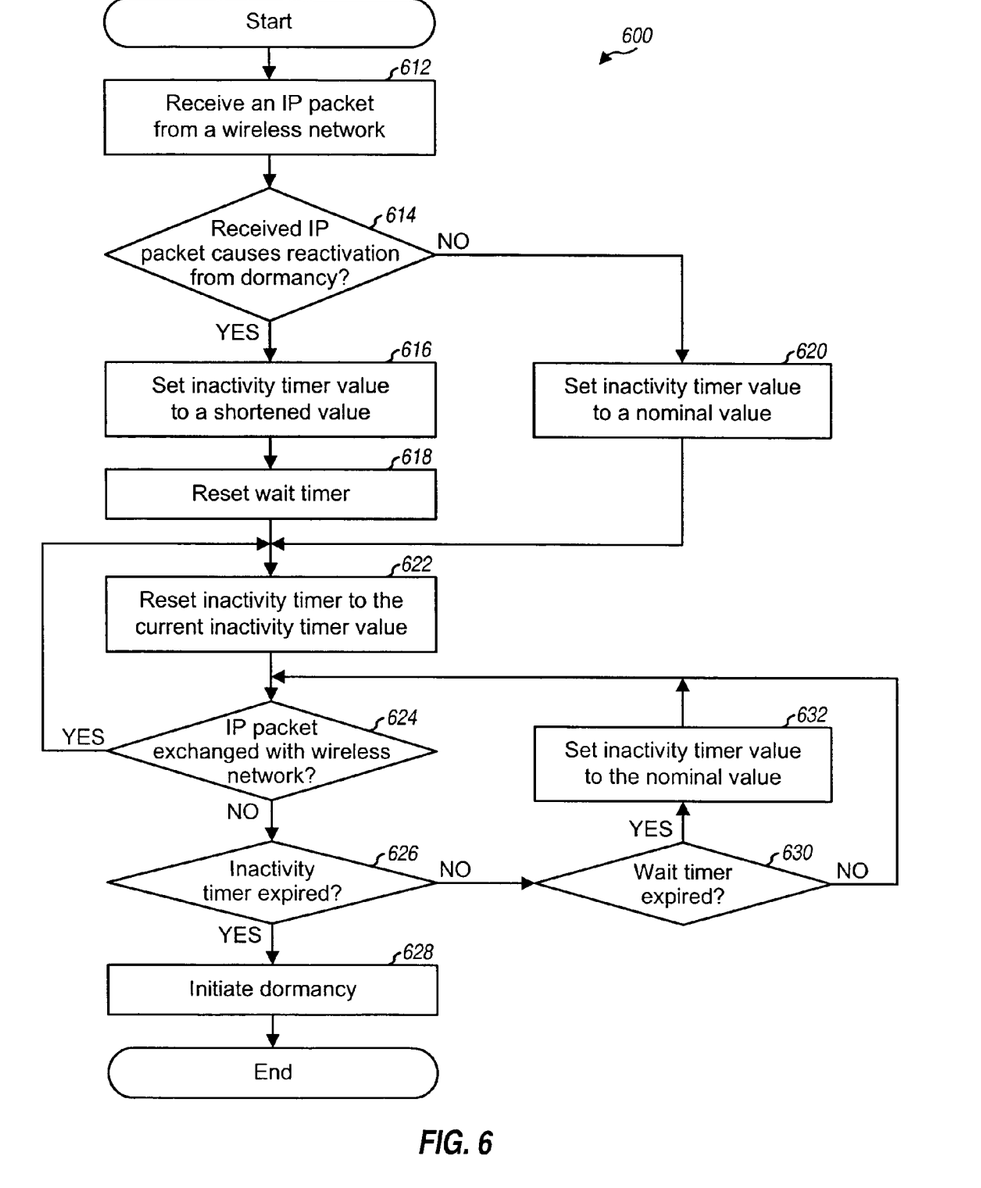
FIG. 6 shows a process for operating the inactivity timer with multiple values.

FIG. 6 shows a flow diagram of a process 600 for operating the inactivity timer with multiple values. Initially, an IP packet is received from the wireless network (block 612). A determination is made whether the received IP packet causes the wireless device to reactivate from dormancy (block 614). If the answer is 'Yes', then the inactivity timer value is set equal to the shortened value (block 616) and the wait timer is reset to the wait period (block 618). Otherwise, if the answer is 'No' for block 614, then the inactivity timer value is set equal to the nominal value (block 620). The inactivity timer is then reset to the current inactivity timer value, which may be the shortened value or the nominal value depending on whether the wireless device was reactivated from dormancy by the received IP packet (block 622). The inactivity timer and the wait timer each count down or up after being reset and expire upon reaching the value loaded in the timer.

Thereafter, a determination is made (e.g., periodically) whether another IP packet is exchanged with the wireless network (block 624). If the answer is 'Yes', then the process returns to block 622 and the inactivity timer is reset to the current inactivity timer value. Otherwise, if the answer is 'No' for block 624, then a determination is made whether the inactivity timer has expired (block 626). If the answer is 'No' for block 626, then a determination is made whether the wait timer has expired (block 630). If the answer is 'Yes' for block 630, then the inactivity timer value is set equal to the nominal value, which is used for the inactivity timer from this point forward (block 632). From block 632 and also if the answer is 'No' for block 630, the process returns to block 624.

If the inactivity timer has expired and the answer is 'Yes' for block 626, then the wireless device initiates dormancy and releases the traffic channels (block 628). The process then terminates. Although not shown in FIG. 6, the inactivity timer value may be set equal to the nominal value when the wireless device goes dormant for any reason. This ensures that the nominal value is used if the wireless device thereafter sends an IP packet to the wireless network.

For process 600, a received IP packet that causes reactivation from dormancy also results in the shortened value being used for the inactivity timer. If the received IP packet is an unsolicited IP packet (e.g., an MS RPC packet) and no other IP packets are exchanged thereafter, then the wireless device initiates dormancy after the shortened period has elapsed and the inactivity timer expires. This early transition to dormancy reduces the amount of time the traffic channels are unnecessarily established. For example, if the nominal value is 20 seconds and the shortened value is 5 seconds, then dormancy may be initiated up to 15 seconds earlier. The early dormancy conserves both radio resources for the wireless network and battery power for the wireless device. Conversely, if the received IP packet is a valid IP packet, then other IP packets may be exchanged thereafter and the inactivity timer would be reset after each IP packet exchange. If the wireless device does not go dormant for the entire wait period, then the nominal value is used for the inactivity timer. The wireless device would then operate in the same manner as in the conventional case.

Process 600 relies on assumptions that (1) unsolicited IP packets are received sporadically, so that the inactivity timer is not continually reset by inbound unsolicited IP packets, and (2) subsequent IP packets are not exchanged in response to receiving unsolicited IP packets, so that the inactivity timer is not reset by outbound IP packets. Process 600 is simple to implement. However, performance is dependent on the accuracy of the underlying assumptions.

FIG. 6 shows a specific embodiment in which two values are used for the inactivity timer, and the shortened value is used for the entire wait period. In another embodiment, the shortened value is used whenever a received IP packet causes reactivation from dormancy, and the nominal value is used once a valid IP packet is received or sent. A received IP packet may be deemed to be a valid IP packet if, e.g., it is delivered to an application or a service running at the wireless device. The wait timer is not needed for this embodiment. In yet another embodiment, the shortened value is used for the wait duration or until a valid IP packet is received, whichever occurs first. For this embodiment, the wait timer effectively expires upon receiving the valid IP packet. In yet another embodiment, the shortened value is used only for the first received IP packet that causes reactivation from dormancy, and the nominal value is used thereafter. For this embodiment, it is not necessary to maintain the wait timer.

In yet another embodiment, more than two values are used for the inactivity timer. For example, each received IP packet may result in the inactivity timer being reset with a progressively longer value, from the shortest value to the nominal value. The first received IP packet may result in the inactivity timer being reset with the shortest value, the next received IP packet may result in the inactivity timer being reset with a longer value, and so on, and the n-th received IP packet may result in the inactivity timer being reset with the nominal value. In general, any number of values may be used for the inactivity timer, and each timer value may be applied in any manner.

In another embodiment of early dormancy, the inactivity timer is selectively reset based on the detected traffic. A single value or multiple values may be used for the inactivity timer. The inactivity timer is not automatically reset upon receiving an inbound IP packet or sending an outbound IP packet. Instead, the inactivity timer is selectively reset whenever an IP packet is deemed to be a valid IP packet.

Figure 7:
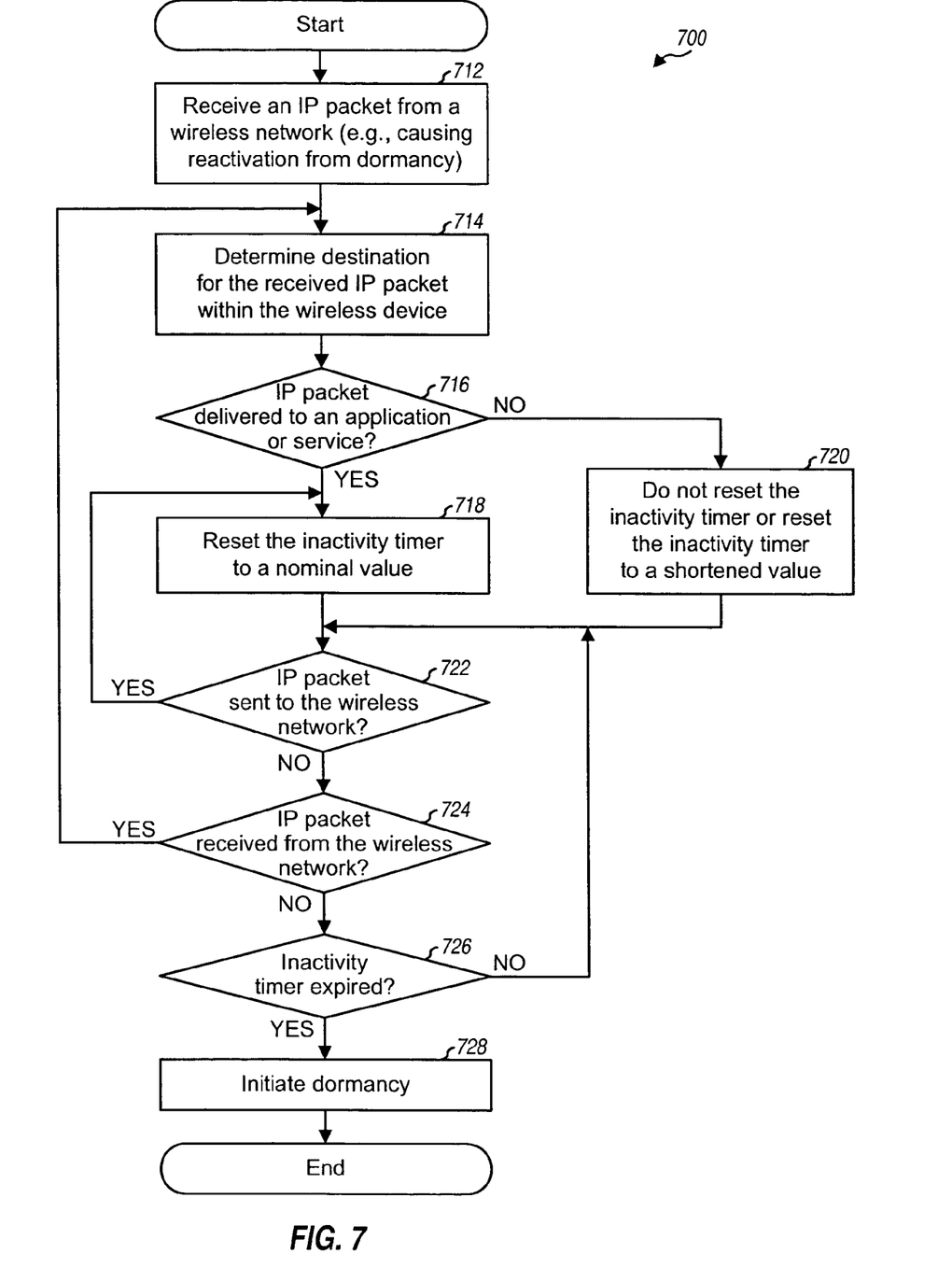
FIG. 7 shows a process for selectively resetting the inactivity timer.

FIG. 7 shows a flow diagram of a process 700 for selectively resetting the inactivity timer. Initially, an IP packet is received from the wireless network (block 712). This received IP packet may or may not have caused reactivation from dormancy. The destination for the received IP packet within the wireless device is then determined (block 714). This may be achieved by (1) examining a destination port number for the received IP packet and (2) determining whether an application or service is listening on this port number. For example, a web application may be running at the wireless device and may use a particular port to send out data. An inbound IP packet destined for this port would be delivered to the web application. The web application may be viewed as having silently solicited the traffic. An inbound IP packet may thus be considered as a valid IP packet if it is destined for a port associated with an application or service running at the wireless device.

A determination is then made whether the received IP packet was delivered to an application or a service running at the wireless device (block 716). If the answer is 'Yes', then the received IP packet is deemed to be a valid IP packet and the inactivity timer is reset to the nominal value (block 718). Otherwise, if the received IP packet is not delivered to an application or service, then the inactivity timer may be allowed to continue (i.e., not reset) or may be reset to a shortened value (block 720). After blocks 718 and 720, the process proceeds to block 722.

In block 722, a determination is made (e.g., periodically) whether an outbound IP packet is sent by the wireless device to the wireless network. If the answer is 'Yes', then the process returns to block 718 and the inactivity timer is reset to the nominal value. Otherwise, a determination is made whether an inbound IP packet is received from the wireless network (block 724). If the answer is 'Yes', then the process returns to block 714 to determine the destination for the received IP packet. If an IP packet was not received and the answer is 'No' for block 724, then a determination is made whether the inactivity timer has expired (block 726). If the answer is 'No', then the process returns to block 722. Otherwise, if the inactivity timer has expired and the answer is 'Yes' for block 726, then the wireless device initiates dormancy and releases the traffic channels (block 728). The process then terminates.

For process 700, the inactivity timer is reset to the nominal value by either a valid received IP packet or an outbound IP packet. The inactivity timer is thus reset to the nominal value whenever valid traffic is detected. The inactivity timer is not reset, or is reset to the shortened value, by an unsolicited IP packet that is not delivered to an application or service running at the wireless device, which may then result in early transition to dormancy.

Process 700 may be triggered by a received IP packet that causes reactivation from dormancy, as indicated in FIG. 7. In general, process 700 may be used for reactivation caused by the wireless network or the wireless device and for both inbound traffic and outbound traffic. Process 700 requires more processing to determine whether each received IP packet is valid or unsolicited. However, process 700 may be more accurate at initiating dormancy early since an attempt is made to ascertain the validity of each received IP packet.

The values for the inactivity timer and the wait timer may be fixed values or configurable values. For example, fixed values may be selected based on characterization of unsolicited traffic that exists for the wireless network. The use of fixed values can simplify implementation of the timers. Configurable values allow for adaptation to the operating environment, which may improve performance. For example, the timer values may be determined based on the nature of the unsolicited IP packets, the wireless network behavior, and so on.

FIGS. 6 and 7 show specific embodiments of identifying unsolicited IP packets and transitioning to dormancy early so that the impact of receiving unsolicited IP packets is mitigated. In general, unsolicited IP packets may be identified in various manners. For example, a received IP packet may be deemed as an unsolicited IP packet if it (1) causes the wireless device to reactivate from dormancy, as described for FIG. 6, (2) is not delivered to an application or service running at the wireless device, as described for FIG. 7, (3) results in no reply or a single reject by the wireless device, or (4) satisfies some other condition or criterion. An unsolicited IP packet may also be identified by the amount of time required for a subsequent data exchange, if any. For example, if a data exchange following a received IP packet is shorter than a predetermined time duration, then the received IP packet may be deemed as an unsolicited IP packet. A data exchange for an unsolicited IP packet is typically quite short in comparison to a data exchange for a valid IP packet. In any case, the detection of received IP packets as unsolicited IP packets may be used to initiate dormancy earlier and hence conserve both radio resources and battery power.

Figure 8:
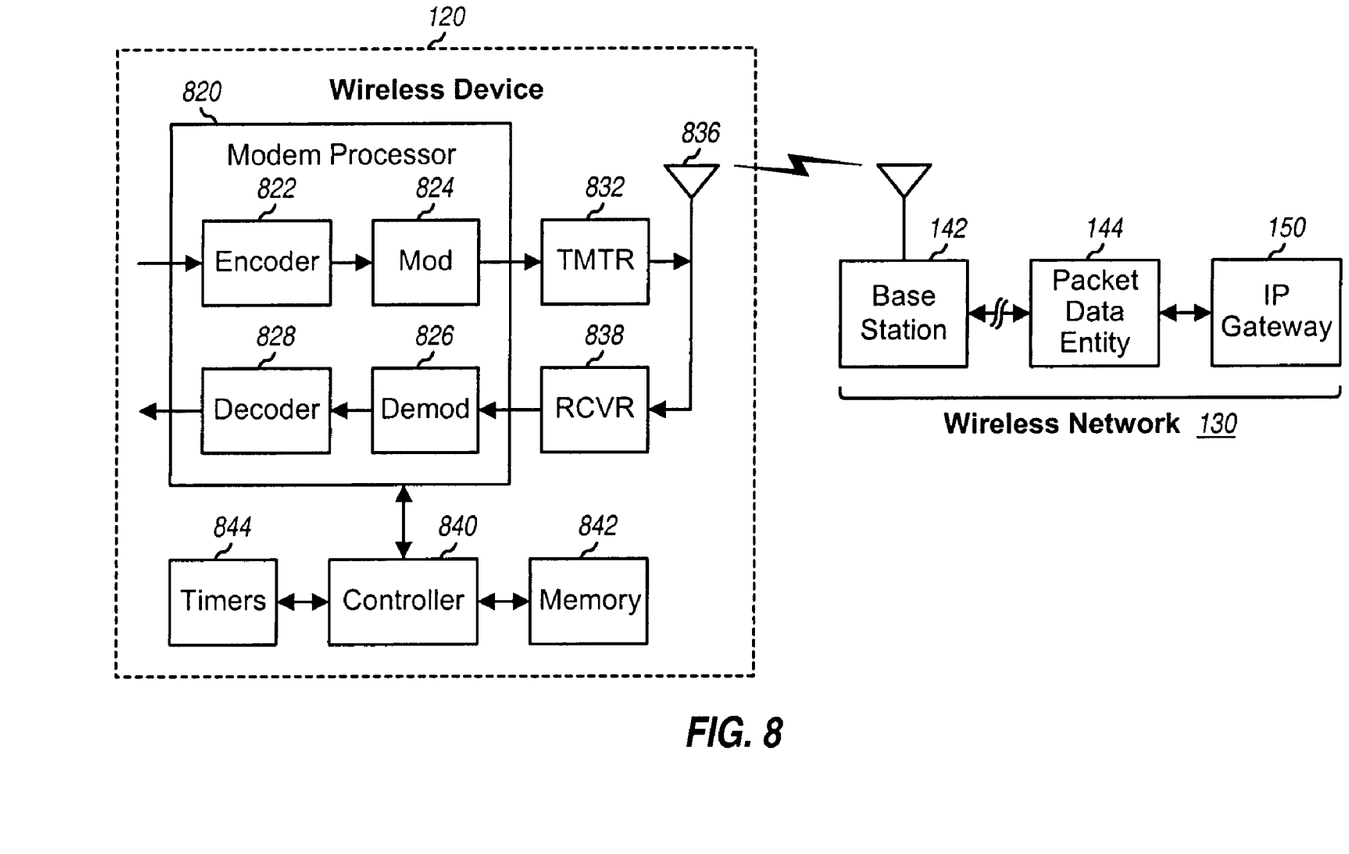
FIG. 8 shows a block diagram of the wireless device.

FIG. 8 shows a block diagram of an embodiment of wireless device 120. Wireless device 120 includes a wireless modem for communication with wireless network 130, a controller 840, a memory 842, and timers 844. On the transmit path, data and signaling to be sent by wireless device 120 are processed (e.g., formatted, encoded, and interleaved) by an encoder 822 and further processed (e.g., modulated, spread, channelized, and scrambled) by a modulator (Mod) 824 to generate a stream of data chips. A transmitter unit (TMTR) 832 then conditions (e.g., converts to analog, filters, amplifies, and frequency upconverts) the data chip stream to generate a reverse link signal, which is transmitted via an antenna 836. On the receive path, forward link signals transmitted by base stations in wireless network 130 are received by antenna 836 and provided to a receiver unit (RCVR) 838. Receiver unit 838 conditions (e.g., filters, amplifies, frequency downconverts, and digitizes) the received signal to generate data samples. A demodulator (Demod) 826 processes (e.g., descrambles, despreads, channelizes, and demodulates) the samples to obtain symbol estimates. A decoder 828 further processes (e.g., deinterleaves and decodes) the symbol estimates to obtain decoded data. Encoder 822, modulator 824, demodulator 826, and decoder 828 may be implemented by a modem processor 820. These units perform processing in accordance with the wireless technology (e.g., W-CDMA or cdma2000) used by wireless network 130.

Controller 840 directs the operation of various units within wireless device 120 and may further execute the applications and implement the protocol stack shown in FIG. 3. Memory unit 842 stores program codes and data used by controller 840 and other units. Timers 844 may implement the inactivity timer, the wait timer, and/or other timers.

Controller 840 may implement processes 400, 600 and/or 700 shown in FIGS. 4, 6 and 7 to mitigate the impact of receiving unsolicited IP packets. Controller 840 may receive pertinent information used to identify unsolicited IP packets. This information may include, e.g., an indication as to whether a received IP packet causes reactivation from dormancy, the destination port number for the received IP packet, and so on. Controller 840 identifies unsolicited IP packets based on the received information and operates the inactivity timer and/or wait timer based on the detected traffic, e.g., as described above for FIGS. 6 and/or 7. Controller 840 may initiate dormancy early if unsolicited IP packets are detected.

The techniques described herein may be implemented by various means. For example, these techniques may be implemented in hardware, software, or a combination thereof. For a hardware implementation, the processing units used to identify unsolicited IP packets and initiate dormancy early may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the techniques may be implemented with modules (e.g., procedures, functions, and so on) that perform the functions described herein. The software codes may be stored in a memory unit (e.g., memory unit 842 in FIG. 8) and executed by a processor (e.g., controller 840). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless device comprising:
   a processor operative to receive a packet from a wireless network while in dormancy; and
   a controller operative to determine whether the received packet is an unsolicited packet not requested from the wireless network and to initiate transition back to dormancy early if the received packet is determined to be an unsolicited packet,
   wherein the controller is operative to reset an inactivity timer to a shortened value if the received packet is determined to be an unsolicited packet and to initiate transition to dormancy upon expiration of the inactivity timer,
   wherein the controller is operative to reset the inactivity timer to a predetermined value if the received packet is determined not to be an unsolicited packet and to initiate transition to dormancy upon expiration of the inactivity timer, and
   wherein the shortened value is shorter than the predetermined value.

2. The wireless device of claim 1, wherein the controller is operative to determine the received packet to be an unsolicited packet if the received packet is not delivered to an application or a service running at the wireless device.

3. The wireless device of claim 1, wherein the controller is operative to determine the received packet to be an unsolicited packet if the received packet results in no reply or a reject reply.

4. The wireless device of claim 3, wherein the reject reply includes sending a transmission control protocol (TCP) reset packet.

5. The wireless device of claim 1, wherein the controller is operative to determine the received packet to be an unsolicited packet if a subsequent data exchange, if any, following receipt of the packet is shorter than a predetermined time duration.

6. The wireless device of claim 1, wherein the shortened value of the inactivity timer is configurable based upon network conditions.

7. The wireless device of claim 6, wherein the shortened value of the inactivity timer is within a range of 1 to 5 seconds.

8. The wireless device of claim 1, wherein the predetermined value of the inactivity timer is configurable based upon network conditions.

9. The wireless device of claim 1, wherein the controller is operative to re-establish one or more traffic channels with the wireless network and remain in an active state for a particular period of time if the received packet is determined not to be an unsolicited packet.

10. A method comprising:
    receiving, at a wireless device, a packet from a wireless network while in dormancy;
    determining whether the received packet is an unsolicited packet not requested from the wireless network; and
    transitioning back to dormancy early if the received packet is determined to be an unsolicited packet, by:
      resetting an inactivity timer to a shortened value if the received packet is determined to be an unsolicited packet
      resetting the inactivity timer to a predetermined value if the received packet is determined not to be an unsolicited packet and
      initiating transition to dormancy upon expiration of the inactivity timer,
      wherein the shortened value is shorter than the predetermined value.

11. The method of claim 10, wherein the determining whether the received packet is an unsolicited packet comprises determining the received packet to be an unsolicited packet if the received packet is not delivered to an application or a service.

12. An apparatus comprising:
means for receiving a packet from a wireless network while in dormancy;
means for determining whether the received packet is an unsolicited packet not requested from the wireless network; and
means for transitioning back to dormancy early if the received packet is determined to be an unsolicited packet, the means for transitioning comprising:
means for resetting an inactivity timer to a shortened value if the received packet is determined to be an unsolicited packet;
means for resetting the inactivity timer to a predetermined value if the received packet is determined not to be an unsolicited packet; and
means for initiating transition to dormancy upon expiration of the inactivity timer,
wherein the shortened value is shorter than the predetermined value.

13. The apparatus of claim 12, further comprising:
means for determining the received packet to be an unsolicited packet if the received packet is not delivered to an application or a service.

14. A non-transitory computer-readable medium comprising instructions, which, when executed by a machine, cause the machine to perform operations, on a wireless device, the non-transitory computer-readable medium comprising:
instructions to determine whether a packet received from a wireless network while in dormancy is an unsolicited packet not requested from the wireless network; and
instructions to initiate transition back to dormancy early if the received packet is determined to be an unsolicited packet, comprising:
instructions to reset an inactivity timer to a shortened value if the received packet is determined to be an unsolicited packet;
instructions to reset the inactivity timer to a predetermined value if the received packet is determined not to be an unsolicited packet; and
instructions to initiate transition to dormancy upon expiration of the inactivity timer,
wherein the shortened value is shorter than the predetermined value.

15. A wireless device comprising:
a processor operative to receive a packet from a wireless network while in dormancy; and
a controller operative to
determine whether the received packet is an unsolicited packet not requested from the wireless network,
use a first timer value for an inactivity timer for a predetermined time duration if the received packet is determined to be an unsolicited packet, the inactivity timer reset to the first timer value upon receipt of a packet during the predetermined time duration,
use a second timer value for the inactivity timer after the predetermined time duration, the inactivity timer reset to the second timer value upon receipt of a packet after the predetermined time duration, and
initiate transition to dormancy upon expiration of the inactivity timer.

16. The wireless device of claim 15, wherein the predetermined time duration is equal to the first timer value or the second timer value.

17. The wireless device of claim 15, wherein the first timer value is configurable.

18. A method comprising:
determining, at a wireless device, whether a packet received while in dormancy is an unsolicited packet not requested from a wireless network;
using a first timer value for an inactivity timer if the received packet is determined to be an unsolicited packet, wherein the first timer value is used for a predetermined time duration, wherein the inactivity timer is reset to the first timer value upon receipt of each packet during the predetermined time duration;
using a second timer value for the inactivity timer after the predetermined time duration; wherein the inactivity timer is reset to the second timer value upon receipt of each packet after the predetermined time duration; and
transitioning to dormancy upon expiration of the inactivity timer.

19. The method of claim 18, wherein the predetermined time duration is equal to the first timer value or the second timer value.

20. A wireless device comprising:
a processor operative to receive a packet from a wireless network; and
a controller operative to determine whether the received packet is an unsolicited packet not requested from the wireless network, to reset an inactivity timer to a nominal value if the received packet is not determined to be an unsolicited packet, to reset the inactivity timer to a shortened value if the received packet is determined to be an unsolicited packet, and to initiate transition to dormancy upon expiration of the inactivity timer, wherein the shortened value is shorter than the nominal value.

* * * * *